(12) United States Patent
Sambhwani et al.

(10) Patent No.: US 8,594,155 B2
(45) Date of Patent: Nov. 26, 2013

(54) MULTI-CARRIER TRANSMITTER DESIGN ON ADJACENT CARRIERS IN A SINGLE FREQUENCY BAND ON THE UPLINK IN W-CDMA/HSPA

(75) Inventors: Sharad D. Sambhwani, San Diego, CA (US); Zae Yong Choi, San Diego, CA (US); Heechoon Lee, San Diego, CA (US); Arjun Bharadwaj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 700 days.

(21) Appl. No.: 12/651,988

(22) Filed: Jan. 4, 2010

(65) Prior Publication Data

US 2010/0172395 A1    Jul. 8, 2010

Related U.S. Application Data

(60) Provisional application No. 61/142,835, filed on Jan. 6, 2009, provisional application No. 61/144,330, filed on Jan. 13, 2009, provisional application No. 61/173,699, filed on Apr. 29, 2009.

(51) Int. Cl.
*H04B 1/69* (2006.01)
*H04B 1/707* (2006.01)

(52) U.S. Cl.
USPC ............ 375/146; 375/260; 375/261; 375/296

(58) Field of Classification Search
USPC .......... 375/142, 146, 241, 267, 279, 295, 296
See application file for complete search history.

(56) References Cited

U.S. PATENT DOCUMENTS 3,937,882 A    2/1976  Bingham
6,181,674 B1 *  1/2001  Xin et al. .................... 370/203

(Continued)

FOREIGN PATENT DOCUMENTS

CN    1272989 A    11/2000
CN    1400830 A     3/2003

(Continued)

OTHER PUBLICATIONS

International Search Report & Written Opinion—PCT/US2010/020267, International Search Authority—European Patent Office—Mar. 15, 2010.
QUALCOMM Europe, "Further description of WCDMA based E-UTRA", 3GPP R1-051109, Oct. 14, 2005, p. 1-12.
Patti J.J., et al., "A Smart Software Radio: Concept Development and Demonstration", IEEE Journal on Selected Areas in Communications, vol. 17, Period 4, Apr. 1999, pp. 631-649.

*Primary Examiner* — Qutbuddin Ghulamali
(74) *Attorney, Agent, or Firm* — Charles Chesney

(57) ABSTRACT

Systems and methodologies are described that facilitate synthesizing a single baseband waveform from digital signals related to multiple carriers. Digital signals can be received relating to a plurality of carriers. The digital signals can result from spreading data symbols from transport blocks to create chip sequences, which can additionally be pulse shaped. The digital signals can be rotated in a positive or negative direction, such as according to a complex sinusoid or a negative representation thereof. The rotated signals can be combined or added to generate a single baseband waveform. The single baseband waveform can be converted to an analog signal, which can be up-converted and centered at a plurality of frequency carriers, which can be adjacent, assigned for transmitting the signal. In addition, optimizations can be provided to ensure threshold power ratio over the plurality of carriers for effectively transmitting jointly encoded signals.

41 Claims, 14 Drawing Sheets

(56) References Cited

U.S. PATENT DOCUMENTS

| | | | |
|---|---|---|---|
| 6,339,621 | B1 | 1/2002 | Cojocaru et al. |
| 6,922,451 | B1 | 7/2005 | Ichihara |
| 7,020,165 | B2 | 3/2006 | Rakib et al. |
| 7,194,039 | B2* | 3/2007 | Hunton .................... 375/260 |
| 7,664,203 | B2* | 2/2010 | Tu et al. .................. 375/316 |
| 7,675,999 | B2* | 3/2010 | Lawrence et al. ........... 375/326 |
| 2005/0047444 | A1* | 3/2005 | Park et al. ................ 370/480 |
| 2006/0245514 | A1* | 11/2006 | Ota et al. .................. 375/270 |
| 2008/0013639 | A1 | 1/2008 | Rick et al. |
| 2009/0319903 | A1* | 12/2009 | Alanara .................... 715/733 |
| 2010/0124162 | A1* | 5/2010 | Nanri et al. ................. 370/210 |

FOREIGN PATENT DOCUMENTS

| | | |
|---|---|---|
| CN | 101060344 A | 10/2007 |
| JP | 2004274243 A | 9/2004 |
| JP | 2005039828 A | 2/2005 |
| WO | 2005011223 A1 | 2/2005 |
| WO | 2007069788 A1 | 6/2007 |
| WO | WO2008027957 | 3/2008 |
| WO | 2008129609 A1 | 10/2008 |

* cited by examiner

MULTI-CARRIER TRANSMITTER DESIGN ON ADJACENT CARRIERS IN A SINGLE FREQUENCY BAND ON THE UPLINK IN W-CDMA/HSPA

CROSS-REFERENCE

This application claims the benefit of U.S. Provisional Application Ser. No. 61/142,835, filed Jan. 6, 2009, and entitled "MULTI-CARRIER TRANSMITTER DESIGN ON ADJACENT CARRIERS IN A SINGLE FREQUENCY BAND ON THE UPLINK IN W-CDMA/HSPA," U.S. Provisional Application Ser. No. 61/144,330, filed Jan. 13, 2009, and entitled "MULTI-CARRIER TRANSMITTER DESIGN ON ADJACENT CARRIERS IN A SINGLE FREQUENCY BAND ON THE UPLINK IN W-CDMA/HSPA," and U.S. Provisional Application Ser. No. 61/173,699, filed Apr. 29, 2009, and entitled "MULTI-CARRIER TRANSMITTER DESIGN ON ADJACENT CARRIERS IN A SINGLE FREQUENCY BAND ON THE UPLINK IN W-CDMA/HSPA," the entireties of which are incorporated herein by reference.

BACKGROUND

I. Field

The present disclosure relates generally to wireless communications and more specifically to multi-carrier transmission in a single frequency band.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), etc., and can use one or more protocols, such as high-speed uplink packet access (HSUPA), single carrier HSUPA (SC-HSUPA), dual carrier HSUPA (DC-HSUPA), etc.

Generally, wireless multiple-access communication systems may simultaneously support communication for multiple mobile devices. Each mobile device may communicate with one or more access points (e.g., base stations, femtocells, picocells, relay nodes, and/or the like) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

Mobile devices operating using SC-HSUPA can transmit over a single carrier at during a given period of time. For example, mobile devices can apply channel coding and multiplexing, spreading, a pulse shaping radio resource control filter, and/or the like to media access control (MAC) or similar layer communications. It is to be appreciated that spreading can include channelization (e.g., transforming a data symbol into a number of chips to increase bandwidth of the signal) and scrambling (e.g., applying a scrambling code to the spread signal). Thus, data symbols on I- and Q-branches can be independently multiplied with an orthogonal variable spreading function code during channelization, and the resultant signals on the I- and Q-branches can be further multiplied by complex-valued scrambling code, where I and Q are real and imaginary parts, respectively, for example. Mobile devices can convert the I and Q branches to an analog signal via a digital-to-analog converter and/or low pass filter. Subsequently, mobile devices can up-convert the analog signal to a radio frequency and transmit the signal to one or more devices or access points. Mobile devices can additionally utilize a power amplifier to increase power utilized for the transmission.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

In accordance with one or more embodiments and corresponding disclosure thereof, various aspects are described in connection with facilitating synthesizing multi-carrier waveforms for uplink transmission over a single transmitter in wireless communications. In one example, multiple digital signals can be generated for multiple data sources, and the data signals can be rotated according to a positive or negative frequency and summed to create a resulting waveform. The resulting waveform can be modulated and transmitted over adjacent carriers in a frequency band to one or more devices or access points. For example, in dual-carrier transmissions, a digital signal from one of two sources can be rotated by a frequency in one direction while the other signal is rotated by the same or similar frequency in the opposite direction. The rotated signals can be combined to create the waveform. In another example, the multiple waveforms can be transmitted over separate transmitters.

According to an aspect, a method is provided that includes rotating a digital signal related to a carrier according to a complex sinusoid to form a rotated digital signal and rotating a disparate digital signal related to a disparate carrier according to a negative representation of the complex sinusoid to form a disparate rotated digital signal. The method also includes combining the rotated digital signal and the disparate rotated digital signal to generate a single baseband waveform.

Another aspect relates to a wireless communications apparatus. The wireless communications apparatus can include at least one processor configured to apply a complex sinusoid to a digital signal to rotate the digital signal and apply a negative representation of the complex sinusoid to a disparate digital signal to rotate the disparate digital signal in an opposite direction as the digital signal. The at least one processor is further configured to add the digital signal and the disparate digital signal to synthesize a single baseband waveform. The wireless communications apparatus also comprises a memory coupled to the at least one processor.

Yet another aspect relates to an apparatus. The apparatus includes means for rotating a digital signal related to a carrier by a rotating frequency in a positive direction and rotating a disparate digital signal related to a disparate carrier by the rotating frequency in a negative direction. The apparatus further includes means for adding the digital signal and the disparate digital signal to generate a single baseband waveform.

Still another aspect relates to a computer program product, which can have a computer-readable medium including code for causing at least one computer to rotate a digital signal related to a carrier according to a complex sinusoid to form a rotated digital signal and code for causing the at least one computer to rotate a disparate digital signal related to a disparate carrier according to a negative representation of the complex sinusoid to form a disparate rotated digital signal. The computer-readable medium can also comprise code for causing the at least one computer to combine the rotated digital signal and the disparate rotated digital signal to generate a single baseband waveform.

Moreover, an additional aspect relates to an apparatus that includes a signal rotating component that rotates a digital signal related to a carrier by a rotating frequency in a positive direction and rotates a disparate digital signal related to a disparate carrier by the rotating frequency in a negative direction. The apparatus can further include a signal combining component that adds the digital signal and the disparate digital signal to generate a single baseband waveform.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed, and the described embodiments are intended to include all such aspects and their equivalents.

DETAILED DESCRIPTION

Figure 1:
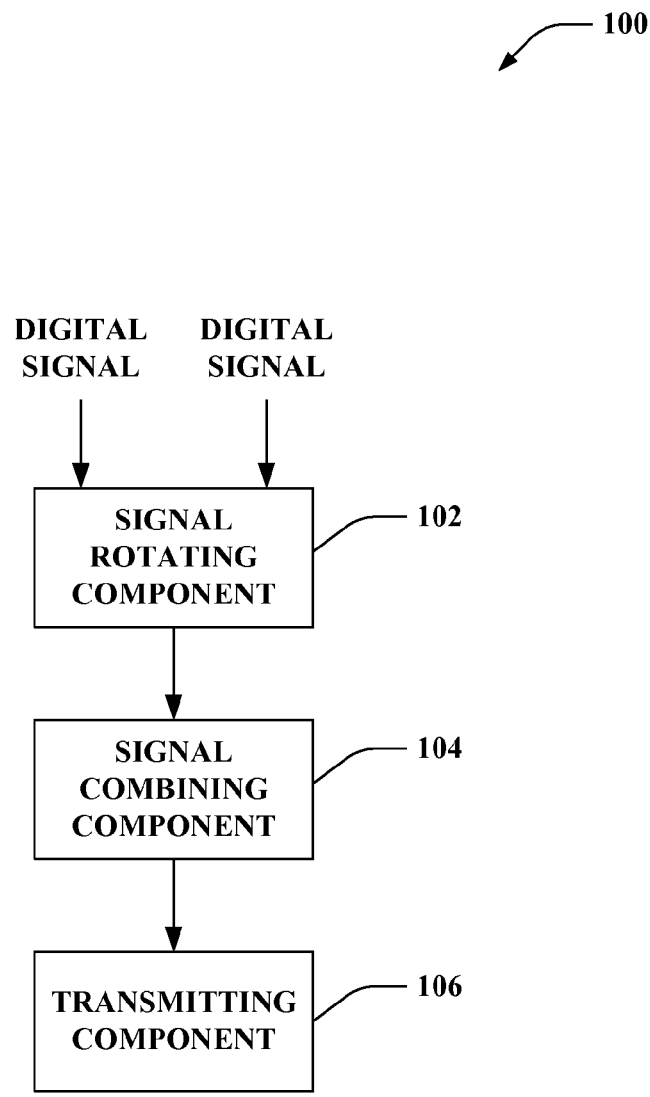
FIG. 1 is a block diagram of a system for rotating and combining digital signals related to a plurality of carriers for creating a single baseband waveform.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Evolved Node B (eNB) or other Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates an example system 100 that facilitates communicating multi-carrier signals using a single transmitter. System 100 includes a signal rotating component 102 that receives a plurality of digital signals for simultaneous transmission and applies a rotation to the signals, a signal combining component 104 that generates a single signal comprising the rotated signals, and a transmitting component 106 that transmits the single signal. In one example, the foregoing components can be comprised within a mobile device, access point, or other device that transmits signals in a wireless network.

According to an example, signal rotating component 102 can receive two digital signals (e.g., in a dual-carrier protocol configuration). The digital signals can correspond to one or more data symbols to be transmitted over a carrier; for example, the digital signals can represent data symbols that are multiplexed, spread, and/or pulse shaped. In one example, spreading can generate complex-valued chip sequences from the data symbols for a given carrier, which can be pulse shaped and sent to the signal rotating component 102. For example, complex-valued chip sequences can refer to a sequence of chips (e.g., bits) that represent the data symbols, such as those generated using Walsh codes, and/or the like. Upon obtaining the two digital signals, signal rotating component 102 can rotate one signal by a complex sinusoid of a frequency in a positive direction and the other signal in a negative direction by the complex sinusoid of the same or similar frequency. In one example, the frequency can be a fraction of a total transmission frequency (e.g., one-half, one-fourth, etc.).

Signal rotating component 102 can provide the rotated signals to signal combining component 104 for generating the single baseband waveform comprising the two signals. Signal combining component 104 can create the single baseband waveform by adding the two rotated signals. Transmitting component 106 can transmit the single baseband waveform in a wireless network. It is to be appreciated that the waveform, in one example, can be converted to an analog signal, up-converted to a frequency band allocated for transmitting such signals, power amplified, etc., before transmitting by the transmitting component 106. Moreover, in one example, the wireless network can utilize a high-speed packet access (HSPA) protocol, such as high-speed uplink packet access (HSUPA), high-speed downlink packet access (HSDPA), etc., or similar protocols, for example.

Figure 2:
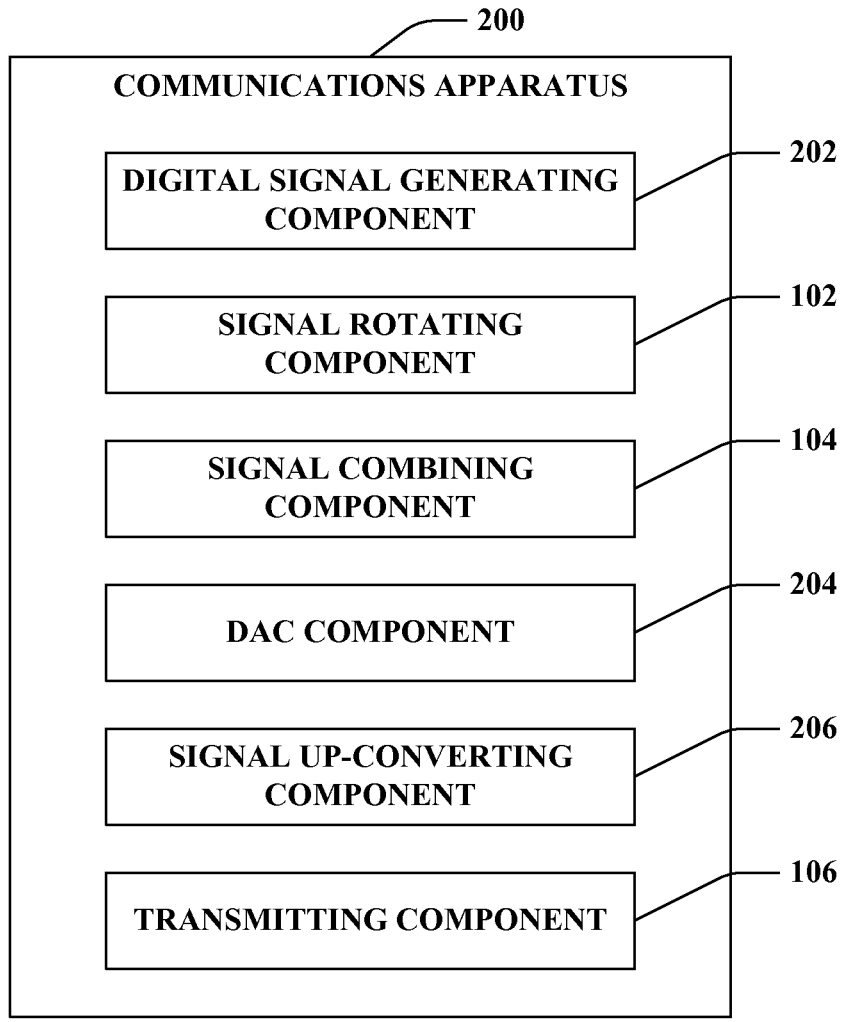
FIG. 2 is an illustration of an example communications apparatus for employment within a wireless communications environment.

Referring next to FIG. 2, a communications apparatus 200 that can participate in a wireless communications network is illustrated. The communications apparatus 200 can be a mobile device, access point, a portion thereof, or substantially any device that can transmit signals in a wireless network. The communications apparatus 200 can include a digital signal generating component 202 that creates one or more digital signals from data received for transmitting over a plurality of carriers, a signal rotating component 102 that applies a rotation to one or more digital signals, a signal combining component 104 that adds the one or more digital signals to create a single baseband waveform, a digital-to-analog conversion (DAC) component 204 that generates an analog representation of the single baseband waveform, a signal up-converting component 206 that transforms the analog signal to a signal at a relevant frequency, and a transmitting component 106 that transmits the up-converted signal.

According to an example, digital signal generating component 202 can receive data for communicating over a plurality of carriers. For example, digital signal generating component 202 can receive the data from a media access control (MAC) or similar layer. Digital signal generating component 202 can create a digital signal for each data stream, which can include channel coding and multiplexing the data, spreading the coded and multiplexed data according to a spreading code to one or more complex-valued chip sequences, pulse shaping the chip sequences, etc. Digital signal generating component 202 can provide the digital signals to signal rotating component 102. Signal rotating component 102, as described, can rotate the signals—one signal in a positive direction, and the other in a negative direction.

Signal combining component 104 can combine the rotated signals (e.g., by adding the signals) to generate a single baseband waveform. DAC component 204 can generate an analog representation of the single baseband waveform, which can include applying a low pass filter to the waveform to reconstruct the analog signal. Signal up-converting component 206 can transform the analog signal to a frequency within the operating range of communications apparatus 200. In an example, signal up-converting component 206 oscillates the analog signal centered at an average frequency that corresponds to a range occupied by a plurality of adjacent carrier frequencies allocated to communications apparatus 200. Transmitting component 106 can transmit the up-converted signal to one or more wireless network devices.

In one example, communications apparatus 200 can operate in a 10 megahertz (MHz) frequency range. In this example, signal rotating component 102 can rotate one of the received digital signals by a complex sinusoid at +2.5 MHz and can rotate another of the received digital signals by a complex sinusoid at −2.5 MHz. In this example, 2.5 MHz can be referred to as the rotating frequency. Signal combining component 104, as described, can combine the signals, and DAC component 204 can create an analog representation of the combined signals. Signal up-converting component 206 can oscillate the analog signal centered between two adjacent frequency carriers that are substantially 5 MHz each. For example, the two adjacent frequency carriers can have been previously assigned to the communications apparatus 200 for transmitting signals to one or more network devices. Transmitting component 106 can transmit the analog signal over the two adjacent frequency carriers.

Moreover, as described, communications apparatus 200 can communicate using an HSUPA protocol, which can be a dual-carrier HSUPA (DC-HSUPA) protocol. In this example, certain channels can be transmitted on dual carriers, such as dedicated physical control channel (DPCCH), enhanced-DPCCH (E-DPCCH), enhanced dedicated physical data channel (E-DPDCH), high-speed DPCCH (HS-DPCCH), etc. using the components and functionality described above, while some channels, such as dedicated physical data channel (DPDCH) are only transmitted over a single carrier. In one example, digital signal generating component 202 can jointly encode E-DPCCH across the dual carriers. For example, this can require additional constraint to ensure that a power ratio between the dual carriers does not exceed a threshold limit. In this example, communications apparatus 200 can be utilizing a portion of an enhanced dedicated channel (E-DCH) transport format combination indicator (E-TFCI) to signal a transport block size (TBS) on one carrier (e.g., the primary carrier) and the remaining portion of E-TFCI to signal the relative difference in TBS on the second carrier. Transmitting component 106 can transmit the E-TFCI signals in this regard to optimize transmission of overhead channels in DC-HSUPA. In another example, transmitting component 106 can transmit HS-DPCCH on a single carrier instead to mitigate possible interference introduced by transmitting the channel over the dual carriers.

Figure 3:
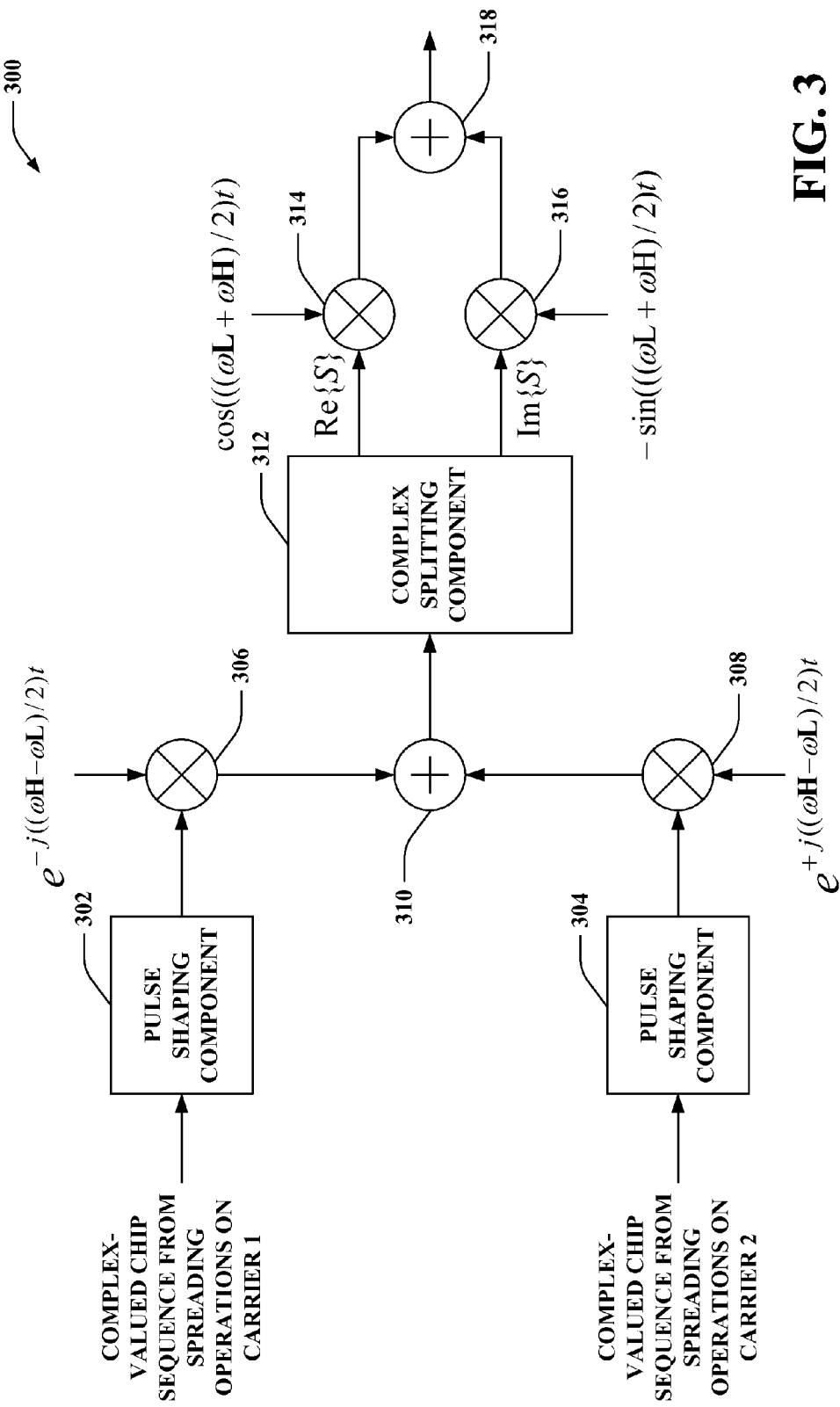
FIG. 3 illustrates an example wireless communication system for rotating and combining two digital signals for transmitting over a single transmitter.

Now referring to FIG. 3, illustrated is a wireless communications system 300 that facilitates modulating a plurality of chip sequences each related to a disparate carrier into a single signal for transmission in a wireless network. System 300, for example, can be part of a transmit processor or other component(s) in a mobile device, access point, or similar device. System 300 can include a plurality of pulse shaping components 302 and 304 that receive chip sequences from spreading operations over a carrier, signal rotating components 306 and 308 that rotate digital signals according to a sinusoid, and a signal combining component 310 that adds rotated signals to form a single baseband waveform. System 300 can also include a complex splitting component 312 that separates a waveform into real and imaginary portions, a plurality of rotators 314 and 316 that apply a transformation to the portions, and a combiner 318 that adds the transformed real and imaginary portions to create a signal for transmitting.

According to an example, pulse shaping component 302 can receive a complex-valued chip sequence from spreading operations on carrier 1, and pulse shaping component 304 can receive a complex-valued chip sequence from spreading operations on carrier 2. Pulse shaping component 302 (and 304) modifies the chip sequences to a waveform suited for transmitting over a communications channel. Signal rotating component 306 can rotate the waveform from pulse shaping component 302 by a negative complex sinusoid corresponding to half of an overall assigned frequency. For example, this can correspond to a low assigned channel frequency ($\omega L$), which can represent carrier 1, and a high assigned channel frequency ($\omega H$), which can represent carrier 2. As described, these can be adjacent frequencies, in one example. Thus, for example, the rotation frequency can be computed as ($\omega H - \omega L$)/2. In this regard, signal rotating component 306 can rotate the signal according to the complex sinusoid $e^{-j((\omega H - \omega L)/2)t}$, where j is the imaginary number and t is a constant.

Similarly, signal rotating component 308 can rotate the signal received from pulse shaping component 304 by a positive representation of the complex sinusoid. Thus, this sinusoid can be $e^{+j((\omega H - \omega L)/2)t}$, for example. Signal combining component 310 can add the rotated signals, as described, and provide the resulting single baseband waveform to complex splitting component 312. Complex splitting component 312 can separate the waveform into its real and imaginary parts, Re{S} and Im{S} respectively. Rotators 314 and 316 can apply a rotation to Re{S} and Im{S}. For example, rotator 314 can rotate Re{S} by $\cos(((\omega L + \omega H)/2)t)$ and rotator 316 can rotate Im{S} by $-\sin(((\omega L + \omega H)/2)t)$. Combiner 318 can combine the rotated real and imaginary portions to create a signal for transmitting in a wireless network.

Figure 4:
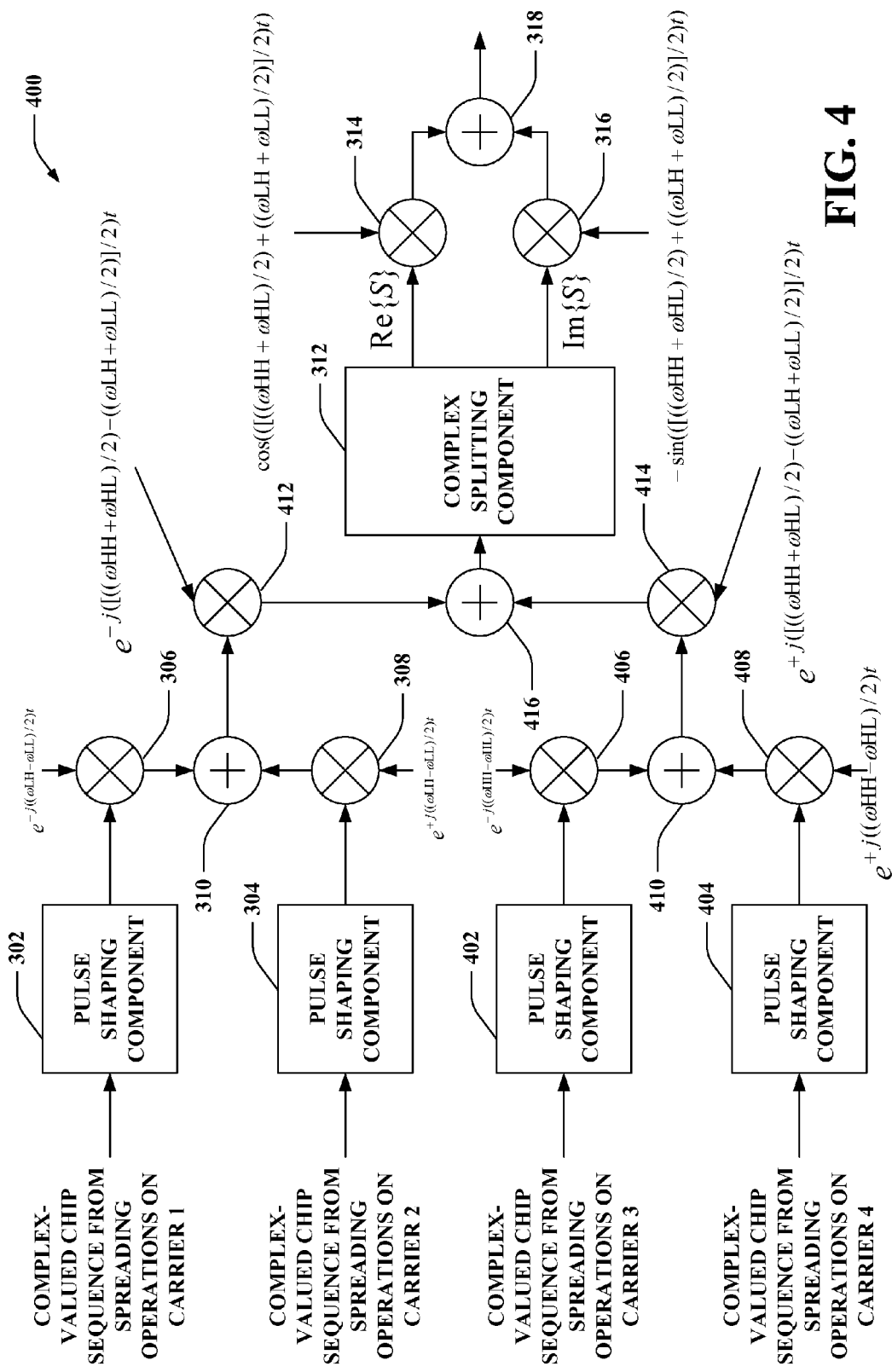
FIG. 4 illustrates an example wireless communication system for rotating and combining four digital signals for transmitting over a single transmitter.

Turning to FIG. 4, illustrated is a wireless communications system 400 that facilitates modulating a plurality of chip sequences each related to a disparate carrier into a single signal for transmission in a wireless network. System 400, for example, can be part of a transmit processor or other component(s) in a mobile device, access point, or similar device. System 400 can include a plurality of pulse shaping components 302, 304, 402, and 404 that receive chip sequences from spreading operations over separate carriers, signal rotating components 306, 308, 406, and 408 that rotate digital signals according to a sinusoid, and signal combining components 310 and 410 that add rotated signals to form a single baseband waveform. System 400 can also include further signal rotating components 412 and 414 that rotate the combined signals according to another complex sinusoid, as well as another signal combining component 416 that adds the further rotated signal to create a single baseband waveform. System 300 additionally includes a complex splitting component 312 that separates a waveform into real and imaginary portions, a plurality of rotators 314 and 316 that apply a transformation to the portions, and a combiner 318 that adds the transformed real and imaginary portions to create a signal for transmitting. It is to be appreciated that system 400 is similar to system 300, but is extended hierarchically to support 4 separate carriers. It is to be further appreciated that the additional systems can be created by similarly extending the hierarchy to support $2^n$ carriers, where n is a positive integer.

According to an example, pulse shaping component 302 can receive a complex-valued chip sequence from spreading operations on carrier 1, pulse shaping component 304 can receive a complex-valued chip sequence from spreading operations on carrier 2, pulse shaping component 402 can receive a complex-valued chip sequence from spreading operations on carrier 3, and pulse shaping component 404 can receive a complex-valued chip sequence from spreading operations on carrier 4. Pulse shaping components 302, 304, 402, and 404 modify the respective chip sequences to a waveform suited for transmitting over a communications channel. Signal rotating components 306 and 406 can rotate the respective waveforms from pulse shaping components 302 and 402 by a negative complex sinusoid corresponding respectively to half of an overall assigned frequency for carriers 1 and 2, and half of an overall frequency assigned for carriers 3 and 4. Similarly, signal rotating components 308 and 408 can rotate the respective waveforms from pulse shaping components 304 and 404 by a positive complex sinusoid corresponding respectively to half of an overall assigned frequency for carriers 1 and 2, and half of an overall frequency assigned for carriers 3 and 4.

Moreover, in this example, the assigned channel frequency for carrier 1 can be represented as ($\omega LL$), the assigned channel frequency for carrier 2 can be represented as ($\omega LH$), the assigned channel frequency for carrier 3 can be represented as ($\omega HL$), and the assigned channel frequency for carrier 4 can be represented as ($\omega HH$). As described, these can be adjacent frequencies, in one example. Thus, for example, the rotation frequency for signal rotating components 306 and 308 can be computed as ($\omega LH - \omega LL$)/2. In this regard, signal rotating component 306 can rotate the signal according to the complex sinusoid $e^{-j((\omega LH-\omega LL)/2)t}$, where j is the imaginary number and t is a constant. Similarly, signal rotating component 308 can rotate the signal received from pulse shaping component 304 by a positive representation of the complex sinusoid. Thus, this sinusoid can be $e^{+j((\omega LH-\omega LL)/2)t}$, for example.

In addition, the rotation frequency for signal rotating components 406 and 408 can be computed as ($\omega HH - \omega HL$)/2. Thus, signal rotating component 406 can rotate the signal according to the complex sinusoid $e^{-j((\omega HH-\omega HL)/2)t}$, where j is the imaginary number and t is a constant. Similarly, signal rotating component 408 can rotate the signal received from pulse shaping component 404 by a positive representation of the complex sinusoid. Thus, this sinusoid can be $e^{+j((\omega HH-\omega HL)/2)t}$, for example.

Additionally, as depicted, signal rotating component 412 can rotate the signal from signal combining component 310 by a rotating frequency computed as [(($\omega HH+\omega HL$)/2)−(($\omega LH+\omega LL$)/2)]/2. In this regard, signal rotating component 412 can rotate the received signal by the sinusoid $e^{-j([((\omega HH+\omega HL)/2)-((\omega LH+\omega LL)/2)]/2)t}$. Similarly, signal rotating component 414 can rotate the combined signal received from signal combining component 410 by the sinusoid $e^{+j([((\omega HH+\omega HL)/2)-((\omega LH+\omega LL)/2)]/2)t}$. Signal combining component 416 can add the rotated signals from signal rotating components 412 and 414, as described, and provide the resulting single baseband waveform to complex splitting component 312.

Complex splitting component 312 can separate the waveform into its real and imaginary parts, Re{S} and Im{S} respectively. Rotators 314 and 316 can apply a rotation to Re{S} and Im{S}. For example, rotator 314 can rotate Re{S} by cos((([(($\omega HH+\omega HL$)/2)+(($\omega LH+\omega LL$)/2)]/2)t), and rotator 316 can rotate Im{S} by −sin(([(($\omega HH+\omega HL$)/2)+(($\omega LH+\omega LL$)/2)]/2)t). Combiner 318 can combine the rotated real and imaginary portions to create a signal for transmitting in a wireless network. As described, $2^n$ carriers can be supported by hierarchically adding additional pulse shaping components, signal rotating components, and signal combining components to similarly create additional combined waveforms.

It is to be appreciated, however, that additional implementations are possible. In one example, to support four carriers, as shown in FIG. 4, alternatively, there can be 4 signal rotating components 306, 308, 406, and 408, the signals for which can be combined by signal combining component 416. In this example, signal combining components 310 and 410, as well as signal rotating components 412 and 414 can be absent. Thus, signal rotating component 306 can rotate a signal from pulse shaping component 302 by the complex sinusoid exp[j(−($\omega HH+\omega HL$)/4−($\omega LH-3\omega LL$)/4)t], signal rotating component 308 can rotate a signal from pulse shaping component 304 by the complex sinusoid exp[j(−($\omega HH+\omega HL$)/4+(3$\omega LH-\omega LL$)/4)t], signal rotating component 406 can rotate a signal from pulse shaping component 402 by the complex sinusoid exp[j(−($\omega LH-3\omega HL$)/4−($\omega LH+\omega LL$)/4)t], and signal rotating component 408 can rotate a signal from pulse shaping component 404 by the complex sinusoid exp[j((3$\omega HH-\omega HL$)/4−($\omega LH+\omega LL$)/4)t].

Figure 5:
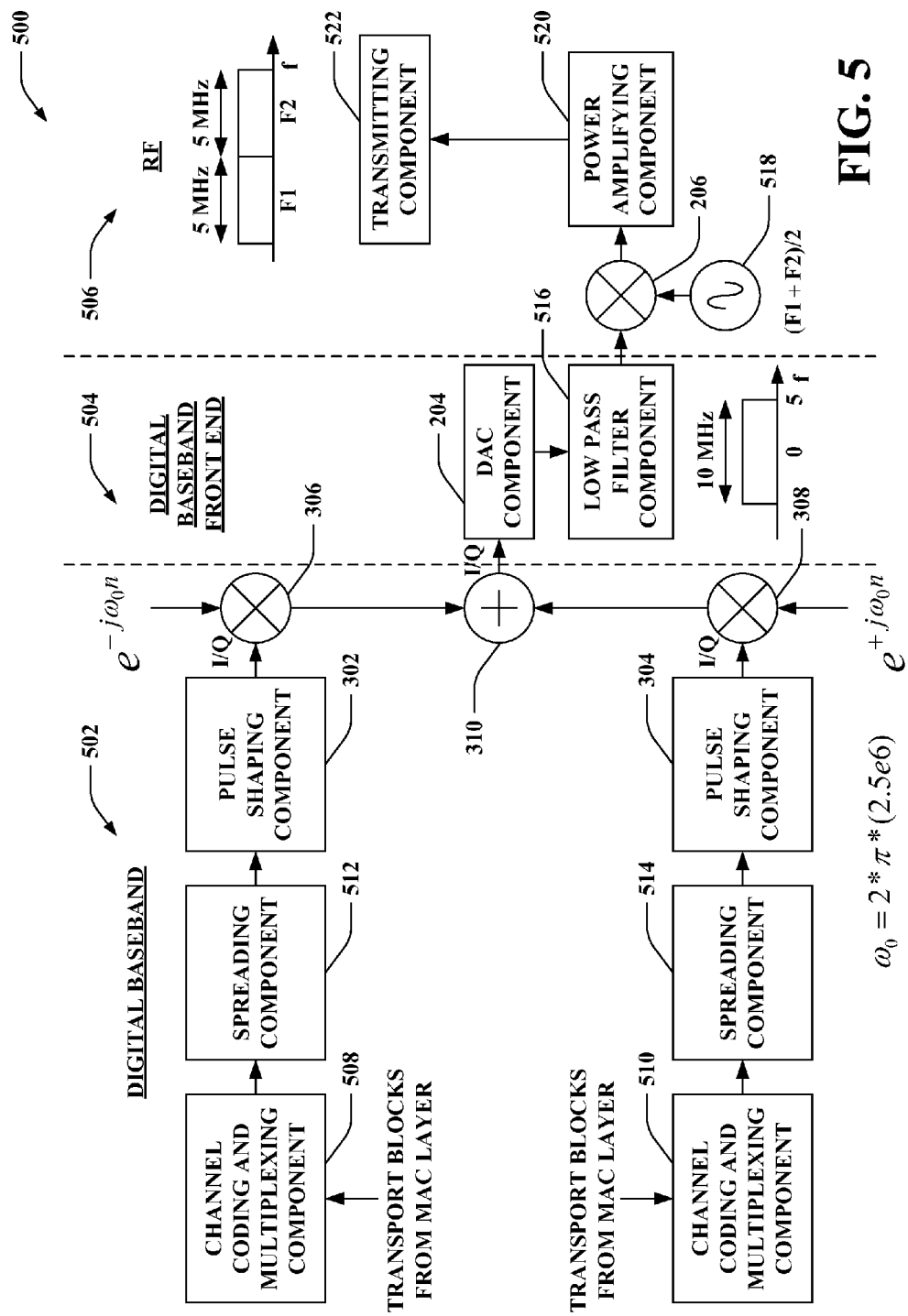
FIG. 5 illustrates an example wireless communication system that generates, rotates, and combines signals related to multiple carriers for transmission over a single transmitter.

Now referring to FIG. 5, illustrated is a wireless communications system 500 that facilitates synthesizing multi-carrier waveforms for uplink transmission over a single transmitter. System 500 can be implemented within a wireless transmitter, as described, which can be part of a mobile device, access point, etc., and/or a portion thereof. As shown and described, system 500 can operate in a 10 MHz frequency range and can be assigned two adjacent 5 MHz frequency portions for transmitting signals in a wireless network. For example, system 500 can be part of a mobile device to which an access point or other device assigns the adjacent 5 MHz carriers for transmitting signals to the access point or other device. System 500 can include a digital baseband portion 502 that can create a single baseband waveform from a plurality of signals related to a plurality of carriers, a digital baseband front end 504 that can convert the waveform to an analog signal, and a radio frequency (RF) portion 506 that can up-convert and transmit the analog signal.

Digital baseband portion 502 can include channel coding and multiplexing components 508 and 510 that transform MAC layer transport blocks for transmission over related communications channels, spreading components 512 that apply spreading codes to the transformed and multiplexed transport blocks to create complex-valued chip sequences, as described, pulse shaping components 302 and 304 that convert the chip sequences to waveforms for transmitting over communications channels, signal rotating components 306 and 308 that apply a complex sinusoid to rotate the waveforms, and a signal combining component 310 that adds the rotated waveforms to create the single baseband waveform.

Digital baseband front end 504 can include a DAC component 204 that converts a digital signal to an analog representation and a low pass filter component 516 that smoothes analog signals. RF portion 506 can include a signal up-converting component 206 that transforms an analog signal to a frequency related to a device employing system 500, an oscillator 518 that centers the signal up-converting component 206 frequency at a specified value, a power amplifying component 520 that sets a transmit power for the signal, and a transmitting component 522 that transmits the signal at the specified power.

According to an example, channel coding and multiplexing components 508 and 510 can receive a plurality of transport blocks from a MAC layer for transmission over separate carriers (e.g., in a DC-HSUPA configuration and/or the like). Channel coding and multiplexing components 508 and 510 can apply coding to the transport blocks related to a communications channel over which the blocks are to be transmitted and can each multiplex the transport blocks related to the specific carrier. Spreading components 512 and 514 can receive the coded and multiplexed transport blocks from channel coding and multiplexing components 508 and 510, respectively. Spreading components 512 and 514 can apply spreading codes to the received transport blocks to create complex-valued chip sequences, as described, and can provide the chip sequences to pulse shaping components 302 and 304, respectively. Pulse shaping components 302 and 304 can create waveforms from the chip sequences that are suited for the related communications channels, as described.

Pulse shaping components 302 and 304 can provide the pulse shaped waveforms respectively to signal rotating components 306 and 308. As described, signal rotating components 306 and 308 can respectively rotate digital signals from pulse shaping components 302 and 304 in opposite directions. For example, signal rotating component 306 can rotate a signal from pulse shaping component 302 by a negative complex sinusoid of 2.5 MHz. In this regard, signal rotating component 306 can apply the sinusoid $e^{-j\omega_0 n}$ to the signal from pulse shaping component 302, where $\omega_0=2*\pi*(2.5e6)$ and n is a constant. Similarly, signal rotating component 308 can apply the sinusoid $e^{+j\omega_0 n}$ to the signal from pulse shaping component 304. As described, signal combining component 310 can add the rotated signals from signal rotating components 306 and 308 to create a single baseband waveform representing data to be transmitted over the two carriers.

Signal combining component 310 can provide the waveform to DAC component 204 for converting to an analog signal. DAC component 204 can convert the waveform to an analog signal, and low pass filter component 516 can smooth the signal for transmission. Low pass filter component 516 can provide the analog signal to signal up-converting component 206. Signal up-converting component 206 can receive input from oscillator 518, which can determine a frequency around which to center the up-converted signal. For example, oscillator 518 can determine a center of the adjacent carriers assigned to system 500. For example, the adjacent carrier frequencies can be respectively represented as F1 and F2. Thus, oscillator 518 can determine the center according to (F1+F2)/2. Signal up-converting component 206 can center the analog signal at (F1+F2)/2 and span the adjacent frequency carriers. As described, system 500 can be assigned 10 MHz, represented by two 5 MHz carriers. Signal up-converting component 206 can pass the signal to the single power amplifying component 520, which can select a power for transmitting the signal over the adjacent carriers, and the single transmitting component 522 can accordingly transmit the signal.

Figure 6:
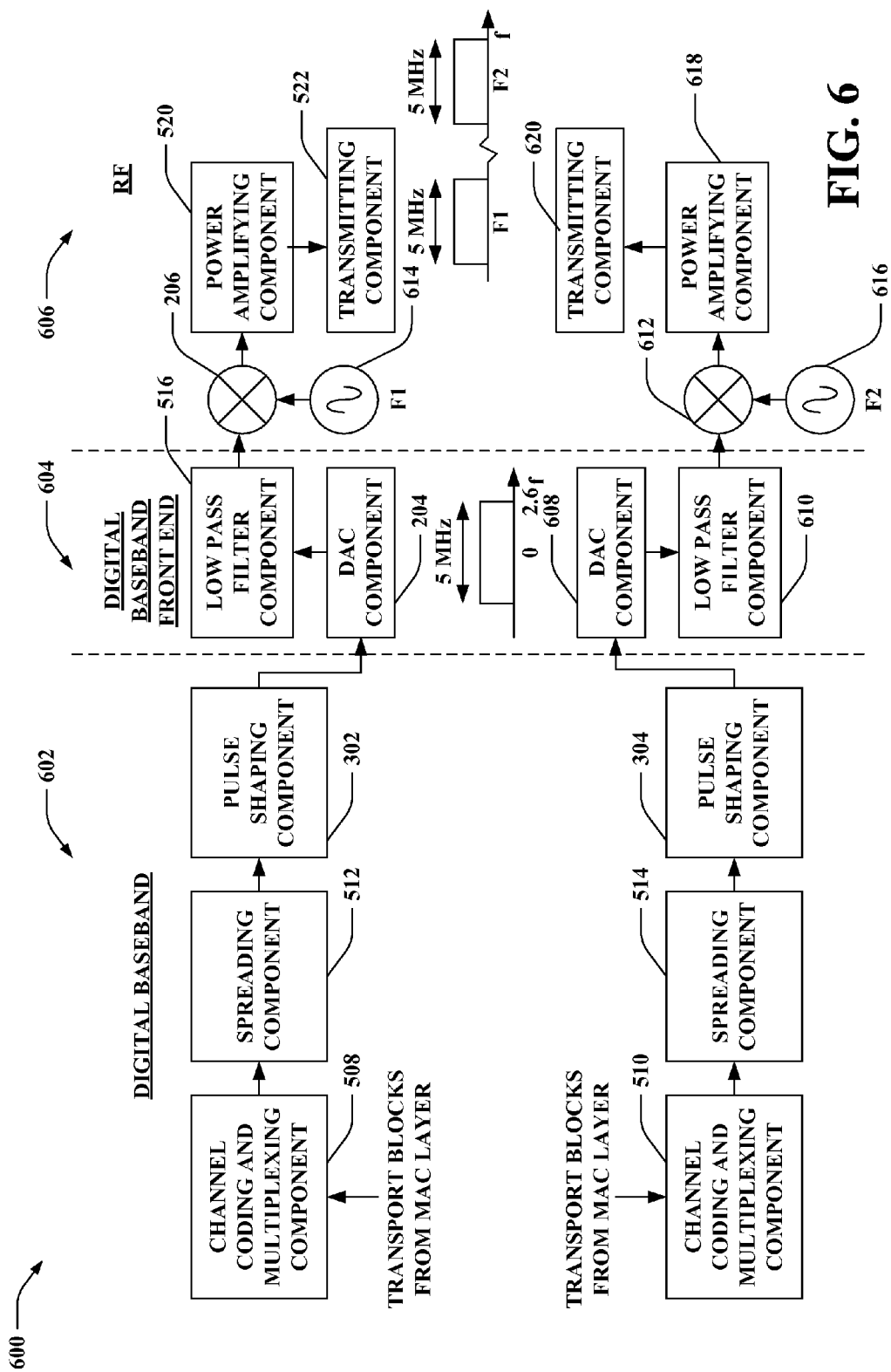
FIG. 6 illustrates an example wireless communication system that generates signals from disparate carriers for transmission over disparate transmitters.

Now referring to FIG. 6, illustrated is a wireless communications system 600 that facilitates synthesizing multi-carrier waveforms for uplink transmission over multiple transmitters. System 600 can be implemented within a wireless transmitter, as described, which can be part of a mobile device, access point, etc., and/or a portion thereof. As shown and described, system 600 can operate in a 10 MHz frequency range and can be assigned two non-adjacent (or adjacent) 5 MHz frequency portions for transmitting signals in a wireless network. For example, system 600 can be part of a mobile device to which an access point or other device assigns the 5 MHz carriers for transmitting signals to the access point or other device. System 600 can include a digital baseband portion 602 that can create waveforms from a plurality of signals related to a plurality of carriers, a digital baseband front end 604 that can convert the waveforms to analog signals, and a radio frequency (RF) portion 606 that can up-convert and transmit the analog signals.

Digital baseband portion 602 can include channel coding and multiplexing components 508 and 510 that transform MAC layer transport blocks for transmission over related communications channels, spreading components 512 that apply spreading codes to the transformed and multiplexed transport blocks to create complex-valued chip sequences, as described, and pulse shaping components 302 and 304 that convert the chip sequences to waveforms for transmitting over communications channels.

Digital baseband front end 604 can include DAC components 204 and 608 that convert digital signals to analog representations and low pass filter components 516 and 610 that smooth the analog signals. RF portion 606 can include signal up-converting components 206 and 612 that transform analog signals to frequencies related to a device employing system 600, oscillators 614 and 616 that respectively center the signal up-converting components 206 and e612 frequencies at specified values, power amplifying components 520 and 618 that set transmit powers for the signals, and transmitting components 522 and 620 that transmit the signals at the specified powers.

According to an example, channel coding and multiplexing components 508 and 510 can receive a plurality of transport blocks from a MAC layer for transmission over separate carriers (e.g., in a DC-HSUPA configuration and/or the like). Channel coding and multiplexing components 508 and 510 can apply coding to the transport blocks related to a communications channel over which the blocks are to be transmitted and can each multiplex the transport blocks related to the specific carrier. Spreading components 512 and 514 can receive the coded and multiplexed transport blocks from channel coding and multiplexing components 508 and 510, respectively. Spreading components 512 and 514 can apply spreading codes to the received transport blocks to create complex-valued chip sequences, as described, and can provide the chip sequences to pulse shaping components 302 and 304, respectively. Pulse shaping components 302 and 304 can create waveforms from the chip sequences that are suited for the related communications channels, as described.

Pulse shaping components 302 and 304 can provide the pulse shaped waveforms respectively to DAC components 204 and 608 for conversion to analog signals. DAC components 204 and 608 can convert the waveforms to analog signals, and low pass filter components 516 and 610 can smooth the signals for transmission. Low pass filter components 516 and 610 can respectively provide the analog signals to signal up-converting components 206 and 612. Signal up-converting component 206 can receive input from oscillator 614, which can determine a frequency (F1) around which to center the up-converted signal. For example, oscillator 614 can determine a first communication carrier assigned to system 600.

Signal up-converting component 206 can center the analog signal at F1 to span the first assigned communication carrier. Signal up-converting component 612 can receive input from oscillator 616, which can determine a frequency (F2) around which to center the up-converted signal. For example, oscillator 614 can determine a second communication carrier assigned to system 600. Signal up-converting component 612 can center the analog signal at F2 to span the second assigned communication carrier. As described, system 600 can be assigned 10 MHz, represented by two 5 MHz carriers. Signal up-converting components 206 and 612 can respectively pass the signals to the power amplifying components 520 and 618, which can select powers for transmitting the signal over the carriers, and the transmitting components 522 and 620 can accordingly transmit the signals.

Figure 7:
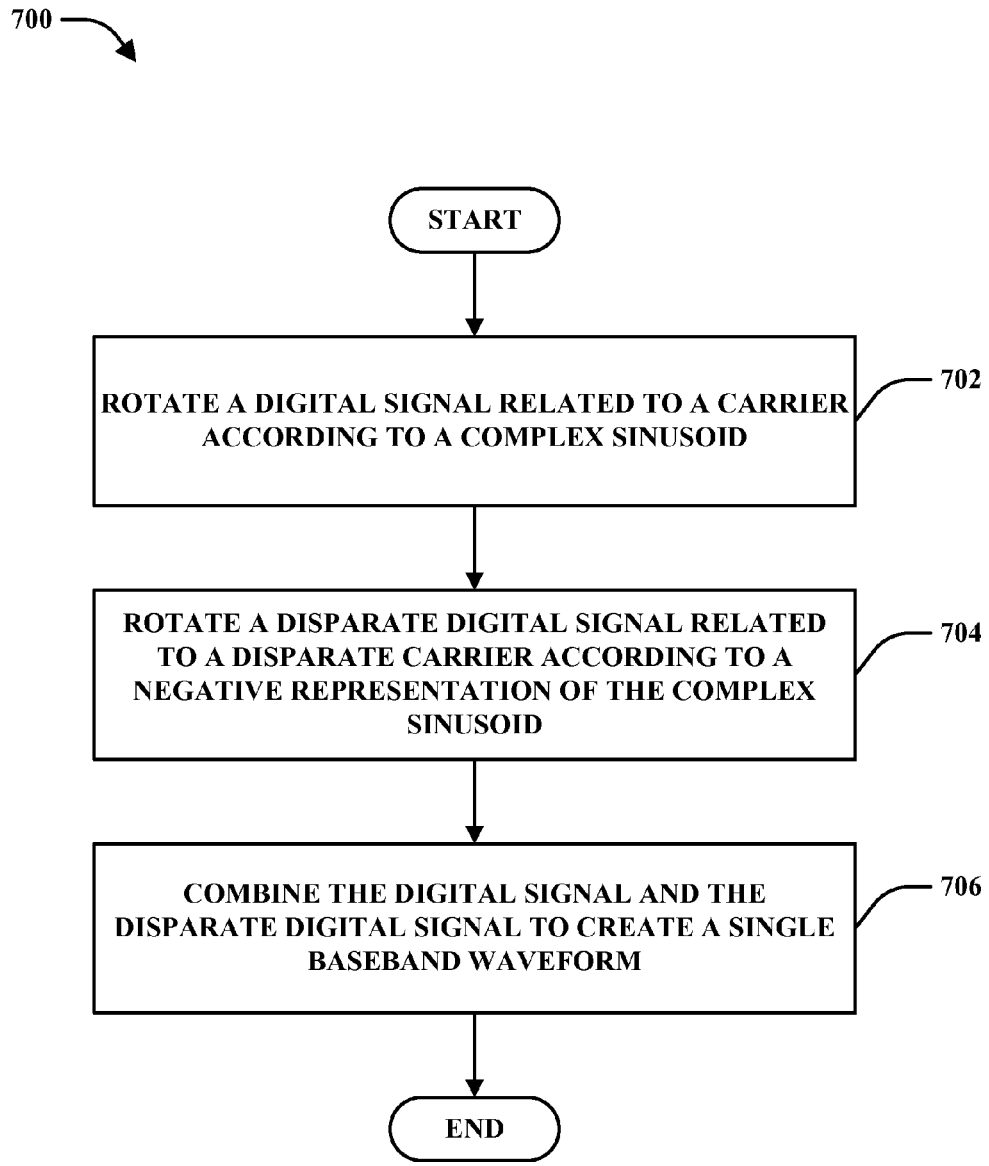
FIG. 7 is a flow diagram of an example methodology that rotates and combines digital signals to generate a single baseband waveform.
Figure 8:
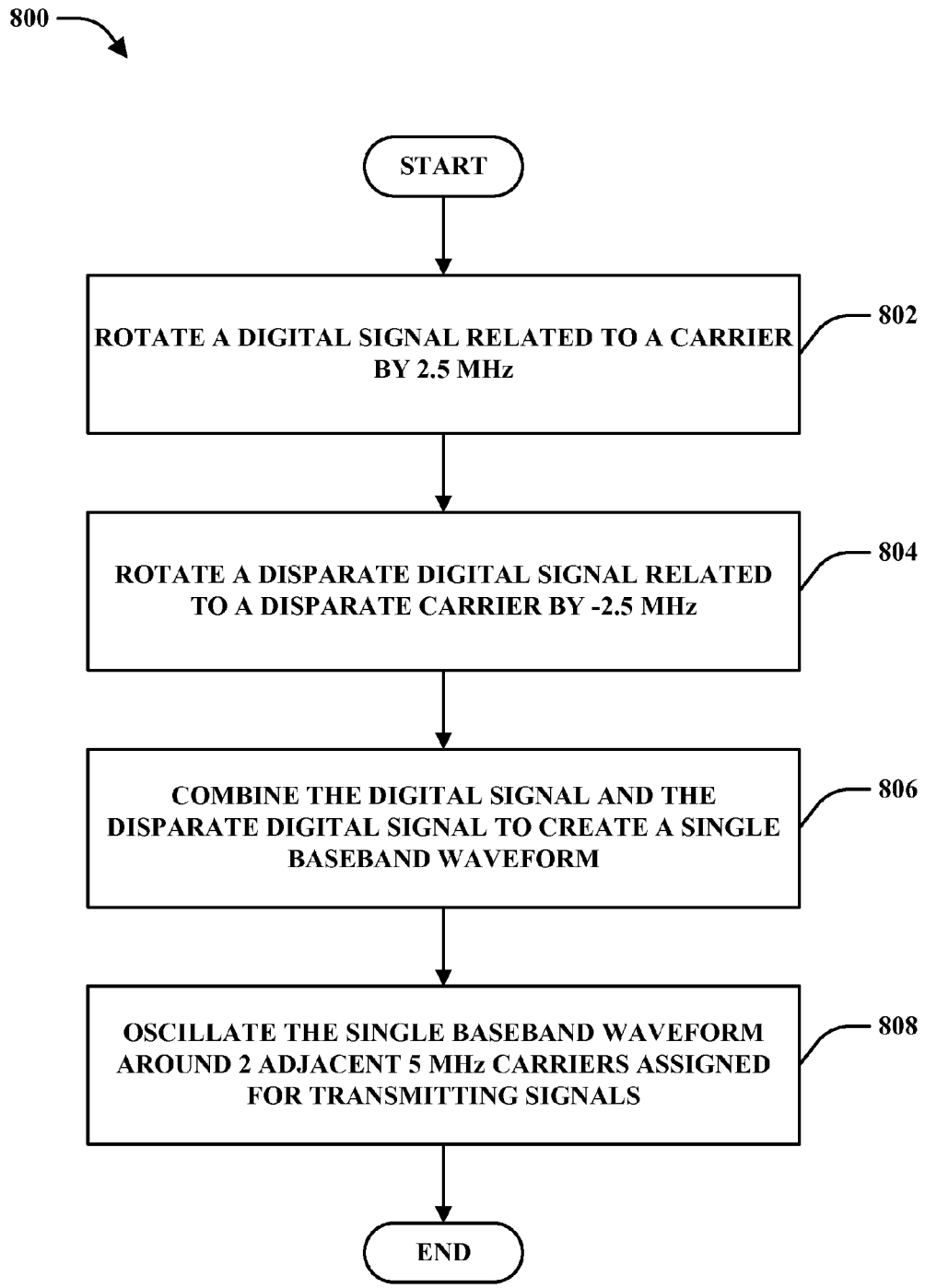
FIG. 8 is a flow diagram of an example methodology that rotates signals by a rotating frequency for subsequent combination to create a single baseband waveform.

Referring now to FIGS. 7-8, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 7, illustrated is an example methodology 700 that can synthesize dual carrier communications over a single baseband waveform. At 702, a digital signal related to a carrier can be rotated according to a complex sinusoid. As described, the complex sinusoid can relate to and be computed according to a rotating frequency. For example, the rotating frequency can be a portion of a frequency allocated for transmitting signals in a wireless network. At 704, a disparate digital signal related to a disparate carrier can be rotated according to a negative representation of the complex sinusoid. Thus, for example, the negative representation of the complex sinusoid can be computed according to a negative value of the rotating frequency, as described. At 706, the digital signal and the disparate digital signal can be combined to create a single baseband waveform. As described, the single baseband waveform can be transmitted over the portion of frequency allocated for transmitting signals such that a single transmitter transmits the dual carrier signals.

Turning now to FIG. 8, an example methodology 800 is shown that facilitates combining rotated digital signals to create a single baseband waveform for transmitting the digital signals. At 802, a digital signal related to a carrier can be rotated by 2.5 MHz. As described, this can include computing a complex sinusoid for rotating by 2.5 MHz in a positive direction and applying the complex sinusoid to the digital signal. A disparate digital signal related to a disparate carrier can be rotated by −2.5 MHz at 804. In this regard, a complex sinusoid can be computed according to the negative rotating frequency, which can be a negative representation of the previous complex sinusoid, as described. At 806, the digital signal and the disparate digital signal can be combined to create a single baseband waveform. At 808, the single baseband waveform can be oscillated around 2 adjacent 5 MHz carriers assigned for transmitting signals. Thus, as described, data from two carriers can be synthesized into a single baseband waveform, which can be transmitted over assigned frequencies to support DC-HSUPA or other dual-carrier transmission protocols.

It will be appreciated that, in accordance with one or more aspects described herein, inferences can be made regarding determining a rotating frequency, selecting an up-convert or oscillating frequency, and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 9:
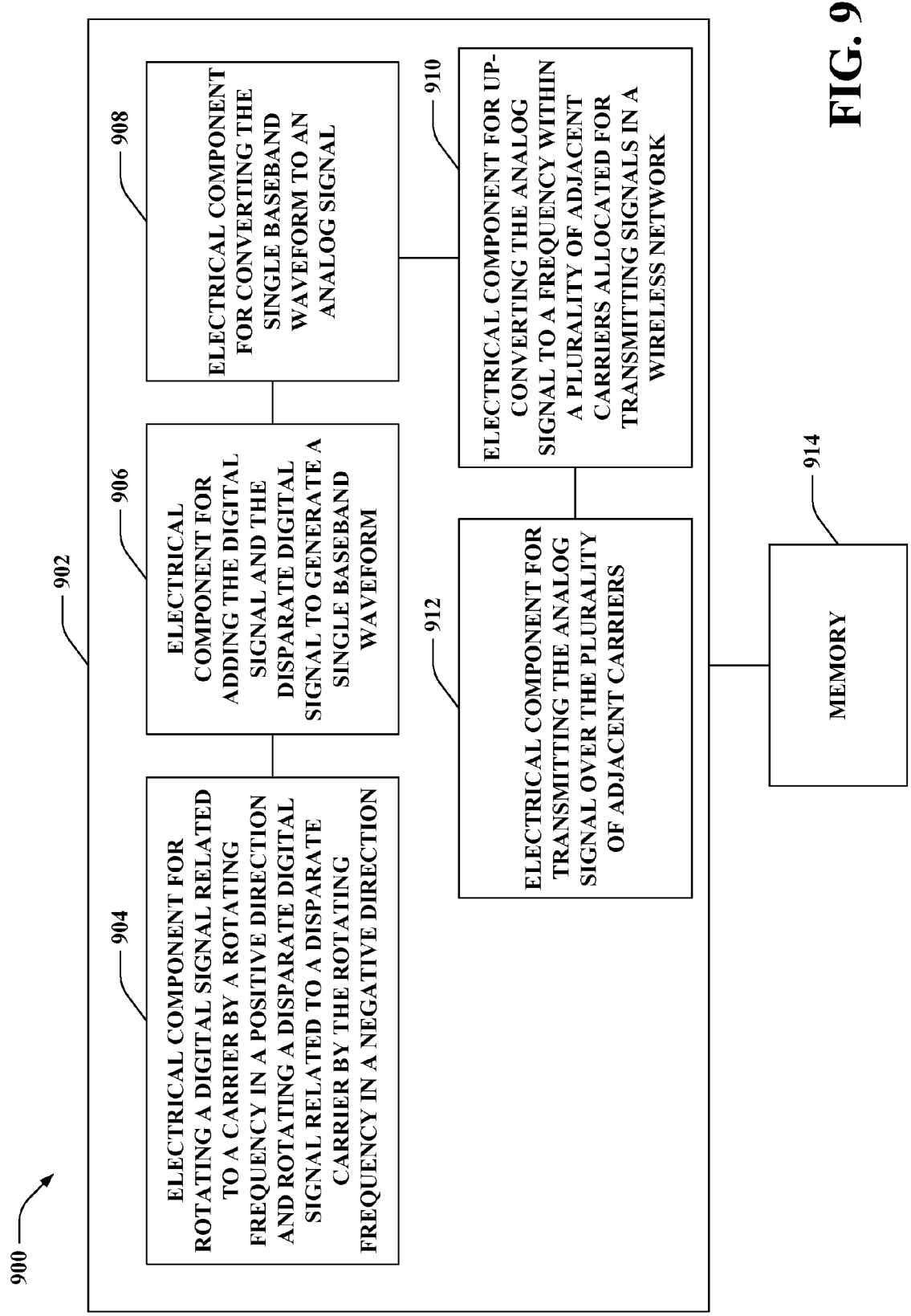
FIG. 9 is a block diagram of an example apparatus that rotates and combines signals for transmitting as a single baseband waveform.

With reference to FIG. 9, illustrated is a system 900 that transmits a single baseband waveform comprising multiple carrier signals. For example, system 900 can reside at least partially within a base station, mobile device, or another device that provides access to a wireless network. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for rotating a digital signal related to a carrier by a rotating frequency in a positive direction and rotating a disparate digital signal related to a disparate carrier by the rotating frequency in a negative direction 904. As described, rotating the signals can include applying a complex sinusoid to the signals that corresponds to rotating by the rotating frequency. Thus, for example, a negative representation of the sinusoid can be applied to the disparate digital signal as it is computed from the negative rotating frequency.

Further, logical grouping 902 can comprise an electrical component for adding the digital signal and the disparate digital signal to generate a single baseband waveform 906. Furthermore, logical grouping 902 can include an electrical component for converting the single baseband waveform to an analog signal 908 and an electrical component for up-converting the analog signal to a frequency within a plurality of adjacent carriers allocated for transmitting signals in a wireless network 910. As described herein, the digital signals from the multiple carriers can be synthesized over a single transmitted waveform. In addition, logical grouping 902 comprises an electrical component for transmitting the analog signal over the plurality of adjacent carriers 912. Additionally, system 900 can include a memory 914 that retains instructions for executing functions associated with electrical components 904, 906, 908, 910, and 912. While shown as being external to memory 914, it is to be understood that one or more of electrical components 904, 906, 908, 910, and 912 can exist within memory 914.

Figure 10:
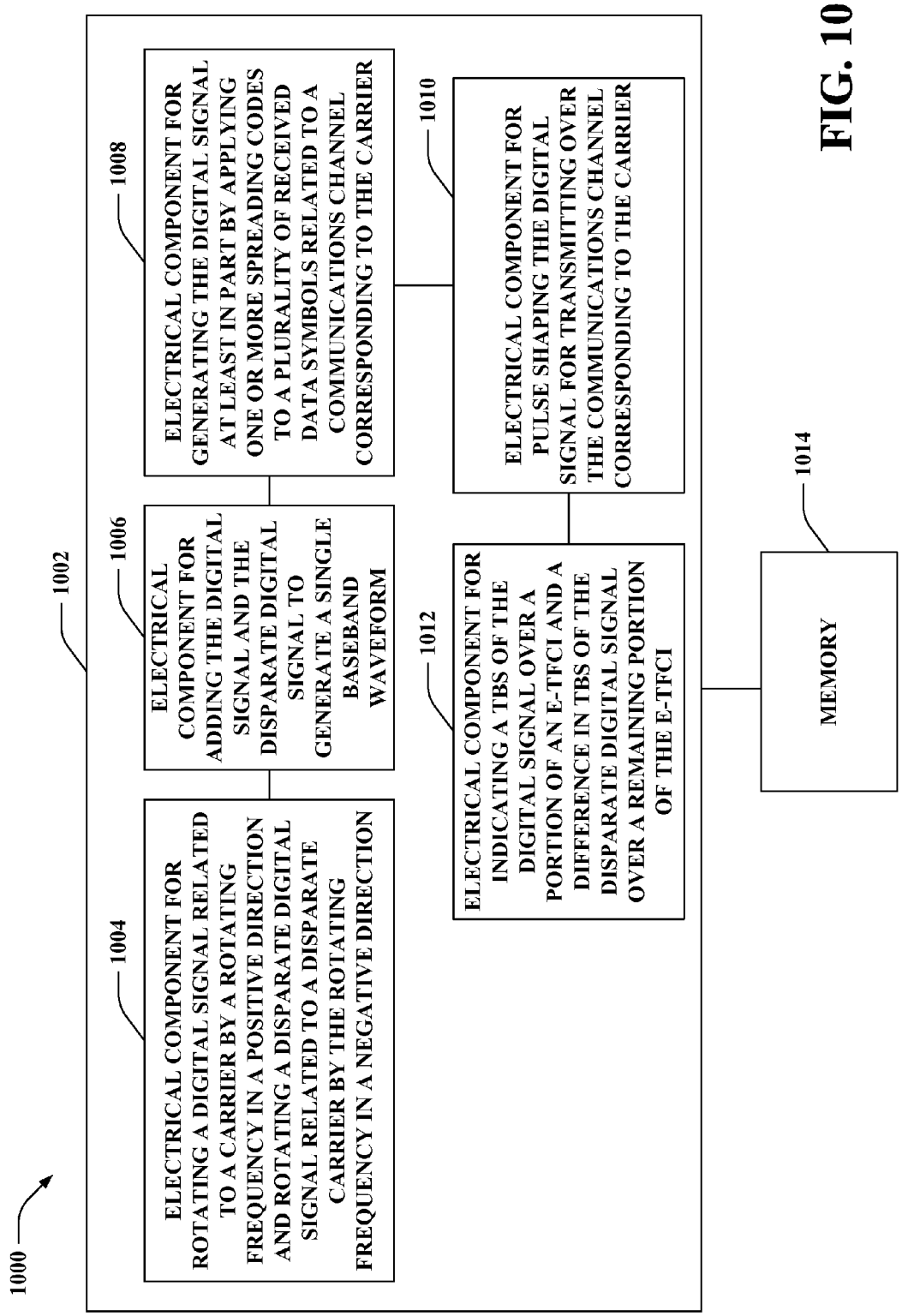
FIG. 10 is a block diagram of an example apparatus that generates signals, which are rotated and combined to create a representative single baseband waveform.

Now referring to FIG. 10, illustrated is a system 1000 that rotates and combines generated digital signals for transmission as a single baseband waveform. For example, system 1000 can reside at least partially within a base station, mobile device, or another device that provides access to a wireless network. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for rotating a digital signal related to a carrier by a rotating frequency in a positive direction and rotating a disparate digital signal related to a disparate carrier by the rotating frequency in a negative direction 1004. As described, rotating the signals can include applying a complex sinusoid to the signals that corresponds to rotating by the rotating frequency. Thus, for example, a negative representation of the sinusoid can be applied to the disparate digital signal as it is computed from the negative value of the rotating frequency.

Further, logical grouping 1002 can comprise an electrical component for adding the digital signal and the disparate digital signal to generate a single baseband waveform 1006. Furthermore, logical grouping 1002 can include an electrical component for generating the digital signal at least in part by applying one or more spreading codes to a plurality of received data symbols related to a communications channel corresponding to the carrier 1008. It is to be appreciated that electrical component 1008 can similarly generate the disparate digital signal by applying one or more spreading codes to received data symbols related to the same or disparate communications channel corresponding to the disparate carrier.

Moreover, logical grouping 1002 can include an electrical component for pulse shaping the digital signal for transmitting over the communications channel corresponding to the carrier 1010. Similarly, it is to be appreciated that electrical component 1010 can pulse shape the disparate digital signal, as described previously. In addition, logical grouping 1002 can include an electrical component for indicating a TBS of the digital signal over a portion of an E-TFCI and a difference in TBS of the disparate digital signal over the remaining portion of the E-TFCI 1012. As described, this can facilitate transmitting jointly encoded channels over the carrier and disparate carrier while maintaining threshold power ratio between the carrier and disparate carrier. Additionally, system 1000 can include a memory 1014 that retains instructions for executing functions associated with electrical components 1004, 1006, 1008, 1010, and 1012. While shown as being external to memory 1014, it is to be understood that one or more of electrical components 1004, 1006, 1008, 1010, and 1012 can exist within memory 1014.

Figure 11:
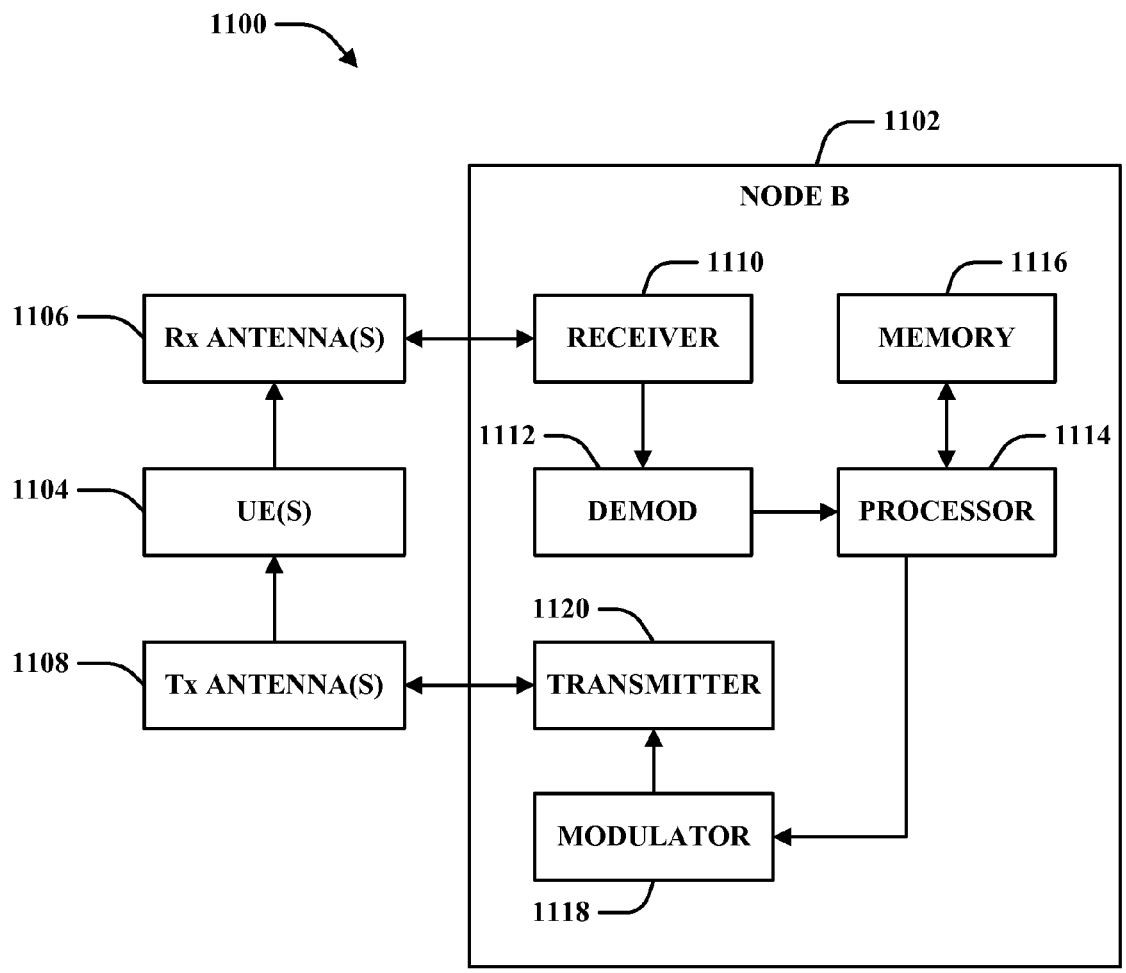
FIGS. 11-12 are block diagrams of example wireless communication devices that can be utilized to implement various aspects of the functionality described herein.

FIG. 11 is a block diagram of a system 1100 that can be utilized to implement various aspects of the functionality described herein. In one example, system 1100 includes a base station or Node B 1102. As illustrated, Node B 1102 can receive signal(s) from one or more UEs 1104 via one or more receive (Rx) antennas 1106 and transmit to the one or more UEs 1104 via one or more transmit (Tx) antennas 1108. Additionally, Node B 1102 can comprise a receiver 1110 that receives information from receive antenna(s) 1106. In one example, the receiver 1110 can be operatively associated with a demodulator (Demod) 1112 that demodulates received information. Demodulated symbols can then be analyzed by a processor 1114. Processor 1114 can be coupled to memory 1116, which can store information related to code clusters, access terminal assignments, lookup tables related thereto, unique scrambling sequences, and/or other suitable types of information. In one example, Node B 1102 can employ processor 1114 to perform methodologies 700, 800, and/or other similar and appropriate methodologies. Node B 1102 can also include a modulator 1118 that can multiplex a signal for transmission by a transmitter 1120 through transmit antenna(s) 1108.

Figure 12:
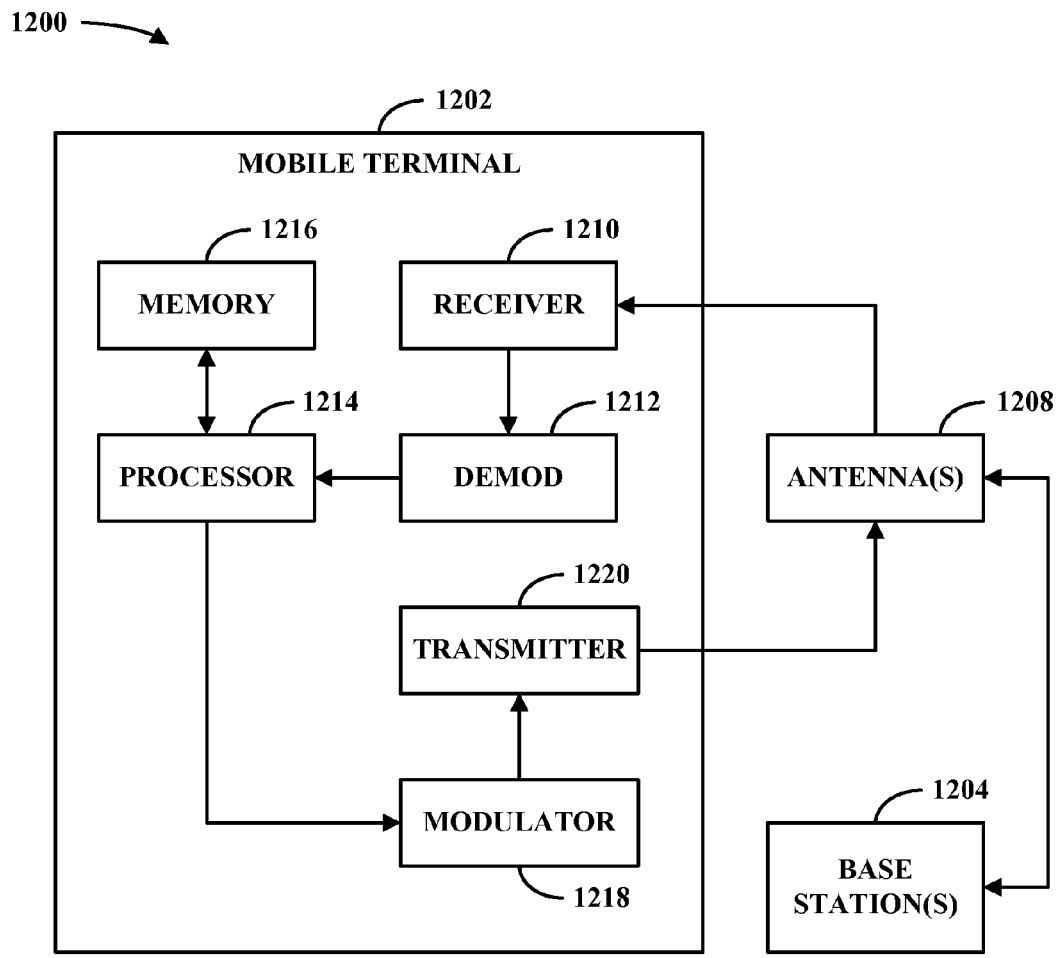

FIG. 12 is a block diagram of another system 1200 that can be utilized to implement various aspects of the functionality described herein. In one example, system 1200 includes a mobile terminal 1202. As illustrated, mobile terminal 1202 can receive signal(s) from one or more base stations 1204 and transmit to the one or more base stations 1204 via one or more antennas 1208. Additionally, mobile terminal 1202 can comprise a receiver 1210 that receives information from antenna(s) 1208. In one example, receiver 1210 can be operatively associated with a demodulator (Demod) 1212 that demodulates received information. Demodulated symbols can then be analyzed by a processor 1214. Processor 1214 can be coupled to memory 1216, which can store data and/or program codes related to mobile terminal 1202. Additionally, mobile terminal 1202 can employ processor 1214 to perform methodologies 700, 800, and/or other similar and appropriate methodologies. Mobile terminal 1202 can also employ one or more components described in previous figures to effectuate the described functionality; in one example, the components can be implemented by the processor 1214. Mobile terminal 1202 can also include a modulator 1218 that can multiplex a signal for transmission by a transmitter 1220 through antenna(s) 1208.

Figure 13:
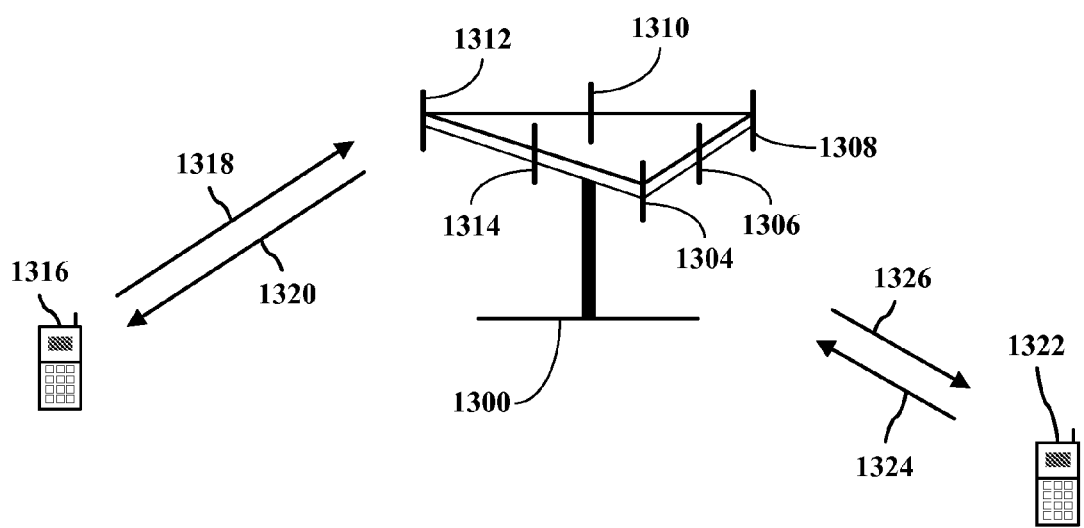
FIG. 13 illustrates an example wireless multiple-access communication system in accordance with various aspects set forth herein.

Referring now to FIG. 13, an illustration of a wireless multiple-access communication system is provided in accordance with various aspects. In one example, an access point 1300 (AP) includes multiple antenna groups. As illustrated in FIG. 13, one antenna group can include antennas 1304 and 1306, another can include antennas 1308 and 1310, and another can include antennas 1312 and 1314. While only two antennas are shown in FIG. 13 for each antenna group, it should be appreciated that more or fewer antennas may be utilized for each antenna group. In another example, an access terminal 1316 can be in communication with antennas 1312 and 1314, where antennas 1312 and 1314 transmit information to access terminal 1316 over forward link 1320 and receive information from access terminal 1316 over reverse link 1318. Additionally and/or alternatively, access terminal 1322 can be in communication with antennas 1306 and 1308, where antennas 1306 and 1308 transmit information to access terminal 1322 over forward link 1326 and receive information from access terminal 1322 over reverse link 1324. In a frequency division duplex system, communication links 1318, 1320, 1324 and 1326 can use different frequency for communication. For example, forward link 1320 may use a different frequency then that used by reverse link 1318.

Each group of antennas and/or the area in which they are designed to communicate can be referred to as a sector of the access point. In accordance with one aspect, antenna groups can be designed to communicate to access terminals in a sector of areas covered by access point 1300. In communication over forward links 1320 and 1326, the transmitting antennas of access point 1300 can utilize beamforming in order to improve the signal-to-noise ratio of forward links for the different access terminals 1316 and 1322. Also, an access point using beamforming to transmit to access terminals scattered randomly through its coverage causes less interference to access terminals in neighboring cells than an access point transmitting through a single antenna to all its access terminals.

An access point, e.g., access point 1300, can be a fixed station used for communicating with terminals and can also be referred to as a base station, a Node B, an access network, and/or other suitable terminology. In addition, an access terminal, e.g., an access terminal 1316 or 1322, can also be referred to as a mobile terminal, user equipment, a wireless communication device, a terminal, a wireless terminal, and/or other appropriate terminology.

Figure 14:
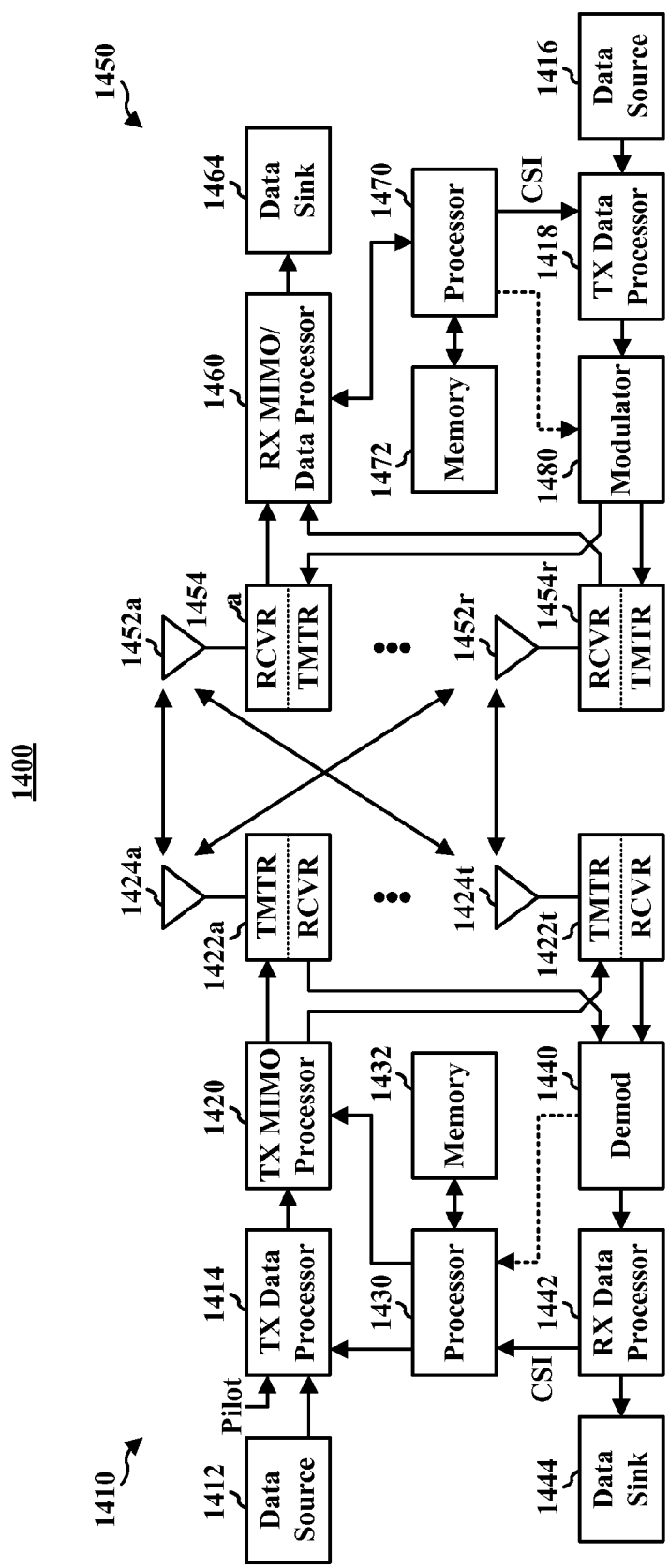
FIG. 14 is a block diagram illustrating an example wireless communication system in which various aspects described herein can function.

Referring now to FIG. 14, a block diagram illustrating an example wireless communication system 1400 in which various aspects described herein can function is provided. In one example, system 1400 is a multiple-input multiple-output (MIMO) system that includes a transmitter system 1410 and a receiver system 1450. It should be appreciated, however, that transmitter system 1410 and/or receiver system 1450 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1410 and/or receiver system 1450 described herein could be utilized in connection with a single output to single input antenna system.

In accordance with one aspect, traffic data for a number of data streams are provided at transmitter system 1410 from a data source 1412 to a transmit (TX) data processor 1414. In one example, each data stream can then be transmitted via a respective transmit antenna 1424. Additionally, TX data processor 1414 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1450 to estimate channel response. Back at transmitter system 1410, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1430.

Next, modulation symbols for all data streams can be provided to a TX MIMO processor 1420, which can further process the modulation symbols (e.g., for OFDM). TX MIMO processor 1420 can then provides $N_T$ modulation symbol streams to $N_T$ transceivers 1422a through 1422t. In one example, each transceiver 1422 can receive and process a respective symbol stream to provide one or more analog signals. Each transceiver 1422 can then further condition (e.g., amplify, filter, and up-convert) the analog signals to provide a modulated signal suitable for transmission over a MIMO channel. Accordingly, $N_T$ modulated signals from transceivers 1422a through 1422t can then be transmitted from $N_T$ antennas 1424a through 1424t, respectively.

In accordance with another aspect, the transmitted modulated signals can be received at receiver system 1450 by $N_R$ antennas 1452a through 1452r. The received signal from each antenna 1452 can then be provided to respective transceivers 1454. In one example, each transceiver 1454 can condition (e.g., filter, amplify, and down-convert) a respective received signal, digitize the conditioned signal to provide samples, and then processes the samples to provide a corresponding "received" symbol stream. An RX MIMO/data processor 1460 can then receive and process the $N_R$ received symbol streams from $N_R$ transceivers 1454 based on a particular receiver processing technique to provide $N_T$ "detected" symbol streams. In one example, each detected symbol stream can include symbols that are estimates of the modulation symbols transmitted for the corresponding data stream. RX MIMO/data processor 1460 can then process each symbol stream at least in part by demodulating, deinterleaving, and decoding each detected symbol stream to recover traffic data for a corresponding data stream. Thus, the processing by RX MIMO/data processor 1460 can be complementary to that performed by TX MIMO processor 1420 and TX data processor 1418 at transmitter system 1410. RX MIMO/data processor 1460 can additionally provide processed symbol streams to a data sink 1464.

In accordance with one aspect, the channel response estimate generated by RX MIMO/data processor 1460 can be used to perform space/time processing at the receiver, adjust power levels, change modulation rates or schemes, and/or other appropriate actions. Additionally, RX MIMO/data processor 1460 can further estimate channel characteristics such as, for example, signal-to-noise-and-interference ratios (SNRs) of the detected symbol streams. RX MIMO/data processor 1460 can then provide estimated channel characteristics to a processor 1470. In one example, RX MIMO/data processor 1460 and/or processor 1470 can further derive an estimate of the "operating" SNR for the system. Processor 1470 can then provide channel state information (CSI), which can comprise information regarding the communication link and/or the received data stream. This information can include, for example, the operating SNR. The CSI can then be processed by a TX data processor 1418, modulated by a modulator 1480, conditioned by transceivers 1454a through 1454r, and transmitted back to transmitter system 1410. In addition, a data source 1416 at receiver system 1450 can provide additional data to be processed by TX data processor 1418.

Back at transmitter system 1410, the modulated signals from receiver system 1450 can then be received by antennas 1424, conditioned by transceivers 1422, demodulated by a demodulator 1440, and processed by a RX data processor 1442 to recover the CSI reported by receiver system 1450. In one example, the reported CSI can then be provided to processor 1430 and used to determine data rates as well as coding and modulation schemes to be used for one or more data streams. The determined coding and modulation schemes can then be provided to transceivers 1422 for quantization and/or use in later transmissions to receiver system 1450. Additionally and/or alternatively, the reported CSI can be used by processor 1430 to generate various controls for TX data processor 1414 and TX MIMO processor 1420. In another example, CSI and/or other information processed by RX data processor 1442 can be provided to a data sink 1444.

In one example, processor 1430 at transmitter system 1410 and processor 1470 at receiver system 1450 direct operation at their respective systems. Additionally, memory 1432 at transmitter system 1410 and memory 1472 at receiver system 1450 can provide storage for program codes and data used by processors 1430 and 1470, respectively. Further, at receiver system 1450, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
   rotating a digital signal related to a carrier according to a complex sinusoid to form a rotated digital signal;
   rotating a disparate digital signal related to a disparate carrier according to a negative representation of the complex sinusoid to form a disparate rotated digital signal;
   combining the rotated digital signal and the disparate rotated digital signal to generate a single baseband waveform; and
   converting the single baseband waveform to an analog signal centered at an average frequency that corresponds to a range occupied by a plurality of adjacent carrier frequencies assigned for transmitting data in a wireless network.

2. The method of claim 1, wherein the complex sinusoid relates to a rotating frequency by which to rotate the digital signal and the disparate digital signal.

3. The method of claim 1, further comprising up-converting the analog signal to a frequency within the plurality of adjacent carriers assigned for transmitting data in the wireless network.

4. The method of claim 3, further comprising oscillating the analog signal centered at the average frequency.

5. The method of claim 4, further comprising transmitting the analog signal over the plurality of adjacent carriers.

6. The method of claim 1, further comprising generating the digital signal at least in part by applying one or more spreading codes to a plurality of transport blocks related to a communications channel utilizing the carrier.

7. The method of claim 6, further comprising pulse shaping the digital signal for transmitting over the communications channel utilizing the carrier.

8. The method of claim 1, wherein the digital signal and the disparate digital signal relate to jointly encoded enhanced dedicated physical control channel data.

9. The method of claim 8, further comprising indicating a transport block size (TBS) of the digital signal over a portion of an enhanced dedicated channel (E-DCH) transport format combination indicator (E-TFCI) and a relative difference in TBS of the disparate digital signal over a remaining portion of the E-TFCI.

10. The method of claim 1, wherein the digital signal is a combination of a plurality of other digital signals related to other carriers.

11. A wireless communications apparatus, comprising:
    at least one processor configured to:
    apply a complex sinusoid to a digital signal to rotate the digital signal;
    apply a negative representation of the complex sinusoid to a disparate digital signal to rotate the disparate digital signal in an opposite direction as the digital signal;
    add the digital signal and the disparate digital signal to synthesize a single baseband waveform: and
    convert the single baseband waveform to an analog signal centered at an average frequency that corresponds to a range occupied by a plurality of adjacent carrier frequencies assigned for transmitting data in a wireless network; and
    a memory coupled to the at least one processor.

12. The wireless communications apparatus of claim 11, wherein the at least one processor is further configured to compute the complex sinusoid based at least in part on a rotating frequency.

13. The wireless communications apparatus of claim 11, wherein the at least one processor is further configured to up-convert the analog signal for transmission within the plurality of adjacent carrier frequencies assigned to the wireless communications apparatus for transmitting signals.

14. The wireless communications apparatus of claim 13, wherein the at least one processor is further configured to oscillate the analog signal centered at the average frequency.

15. The wireless communications apparatus of claim 14, wherein the at least one processor is further configured to transmit the analog signal over the plurality of adjacent carrier frequencies.

16. The wireless communications apparatus of claim 11, wherein the at least one processor is further configured to create the digital signal and the disparate digital signal at least in part by spreading a plurality of received data symbols related to one or more communications channels according to one or more spreading codes.

17. The wireless communications apparatus of claim 16, wherein the at least one processor is further configured to apply pulse shaping to the digital signal and the disparate digital signal.

18. An apparatus, comprising:
    means for rotating a digital signal related to a carrier by a rotating frequency in a positive direction and rotating a disparate digital signal related to a disparate carrier by the rotating frequency in a negative direction;
    means for adding the digital signal and the disparate digital signal to generate a single baseband waveform; and
    means for converting the single baseband waveform to an analog signal centered at an average frequency that corresponds to a range occupied by a plurality of adjacent carrier frequencies assigned for transmitting data in a wireless network.

19. The apparatus of claim 18, wherein the means for rotating the digital signal applies a complex sinusoid corresponding to the rotating frequency to the digital signal and a negative representation of the complex sinusoid corresponding to the rotating frequency to the disparate digital signal.

20. The apparatus of claim 19, further comprising means for up-converting the analog signal to a frequency within the plurality of adjacent carriers allocated to the apparatus for transmitting signals in the wireless network.

21. The apparatus of claim 20, wherein the means for up-converting the analog signal oscillates the analog signal centered at the average frequency.

22. The apparatus of claim 21, further comprising means for transmitting the analog signal over the plurality of adjacent carriers.

23. The apparatus of claim 18, further comprising means for generating the digital signal at least in part by applying one or more spreading codes to a plurality of received data symbols related to a communications channel corresponding to the carrier.

24. The apparatus of claim 23, further comprising means for pulse shaping the digital signal for transmitting over the communications channel corresponding to the carrier.

25. The apparatus of claim 18, wherein the digital signal and the disparate digital signal relate to jointly encoded enhanced dedicated physical control channel data.

26. The apparatus of claim 25, further comprising means for indicating a transport block size (TBS) of the digital signal over a portion of an enhanced dedicated channel (E-DCH) transport format combination indicator (E-TFCI) and a difference in TBS of the disparate digital signal over a remaining portion of the E-TFCI.

27. The apparatus of claim 18, wherein the digital signal is a combination of a plurality of other digital signals related to other carriers.

28. A computer program product, comprising:
  a non-transitory computer-readable medium comprising:
    code for causing at least one computer to rotate a digital signal related to a carrier according to a complex sinusoid to form a rotated digital signal;
    code for causing the at least one computer to rotate a disparate digital signal related to a disparate carrier according to a negative representation of the complex sinusoid to form a disparate rotated digital signal;
    code for causing the at least one computer to combine the rotated digital signal and the disparate rotated digital signal to generate a single baseband waveform: and
    code for causing the at least one computer to convert the single baseband waveform to an analog signal centered at an average frequency that corresponds to a range occupied by a plurality of adjacent carrier frequencies assigned for transmitting data in a wireless network.

29. The computer program product of claim 28, wherein the complex sinusoid relates to a rotating frequency by which the code for causing the at least one computer to rotate the digital signal rotates the digital signal.

30. The computer program product of claim 29, wherein the non-transitory computer-readable medium further comprises code for causing the at least one computer to up-convert the analog signal to a frequency within the plurality of adjacent carriers assigned for transmitting data in the wireless network.

31. The computer program product of claim 30, wherein the non-transitory computer-readable medium further comprises code for causing the at least one computer to oscillate the analog signal centered at the average frequency.

32. The computer program product of claim 31, wherein the non-transitory computer-readable medium further comprises code for causing the at least one computer to transmit the analog signal over the plurality of adjacent carriers.

33. The computer program product of claim 28, wherein the non-transitory computer-readable medium further comprises code for causing the at least one computer to generate the digital signal at least in part by applying one or more spreading codes to a plurality of transport blocks related to a communications channel utilizing the carrier.

34. The computer program product of claim 33, wherein the non-transitory computer-readable medium further comprises code for causing the at least one computer to pulse shape the digital signal for transmitting over the communications channel utilizing the carrier.

35. An apparatus, comprising:
  a signal rotating component that rotates a digital signal related to a carrier by a rotating frequency in a positive direction and rotates a disparate digital signal related to a disparate carrier by the rotating frequency in a negative direction;
  a signal combining component that adds the digital signal and the disparate digital signal to generate a single baseband waveform; and
  a digital-to-analog converting component that transforms the single baseband waveform to an analog signal centered at an average frequency that corresponds to a range occupied by a plurality of adjacent carrier frequencies assigned for transmitting data in a wireless network.

36. The apparatus of claim 35, wherein the signal rotating component applies a complex sinusoid corresponding to the rotating frequency to the digital signal and a negative representation of the complex sinusoid corresponding to the rotating frequency to the disparate digital signal.

37. The apparatus of claim 36, further comprising a signal up-converting component that transforms the analog signal to a frequency within the plurality of adjacent carriers allocated to the apparatus for transmitting signals in the wireless network.

38. The apparatus of claim 37, wherein the signal up-converting component oscillates the analog signal centered at the average frequency.

39. The apparatus of claim 38, further comprising a transmitting component that communicates the analog signal over the plurality of adjacent carriers.

40. The apparatus of claim 35, further comprising a spreading component that generates the digital signal at least in part by applying one or more spreading codes to a plurality of received data symbols related to a communications channel corresponding to the carrier.

41. The apparatus of claim 40, further comprising a pulse shaping component that modifies the digital signal for transmitting over the communications channel corresponding to the carrier.

* * * * *